P. H. LINT.
FRUIT GATHERER.
APPLICATION FILED JUNE 1, 1914.
1,136,249.
Patented Apr. 20, 1915.
Fig. 1.
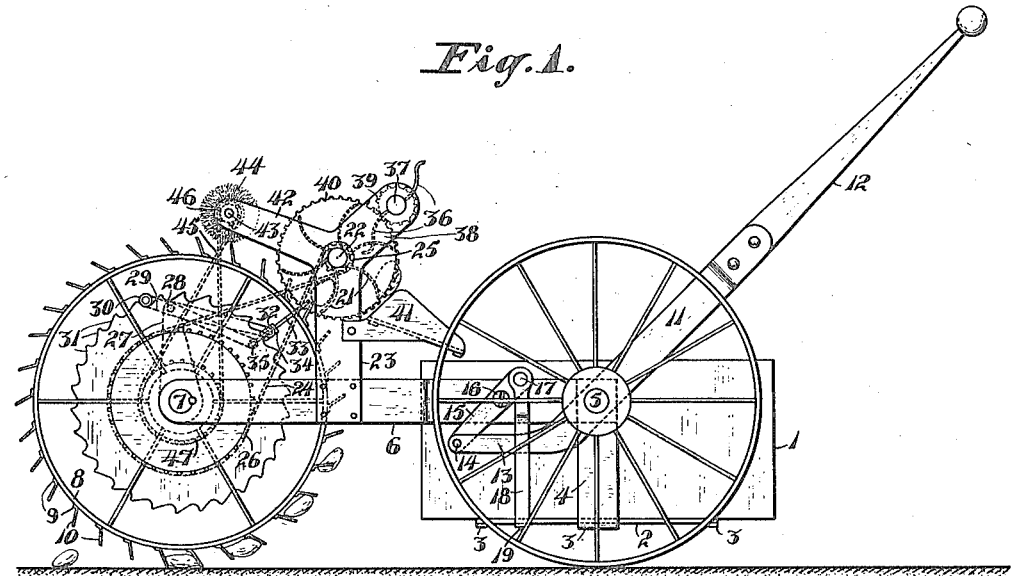
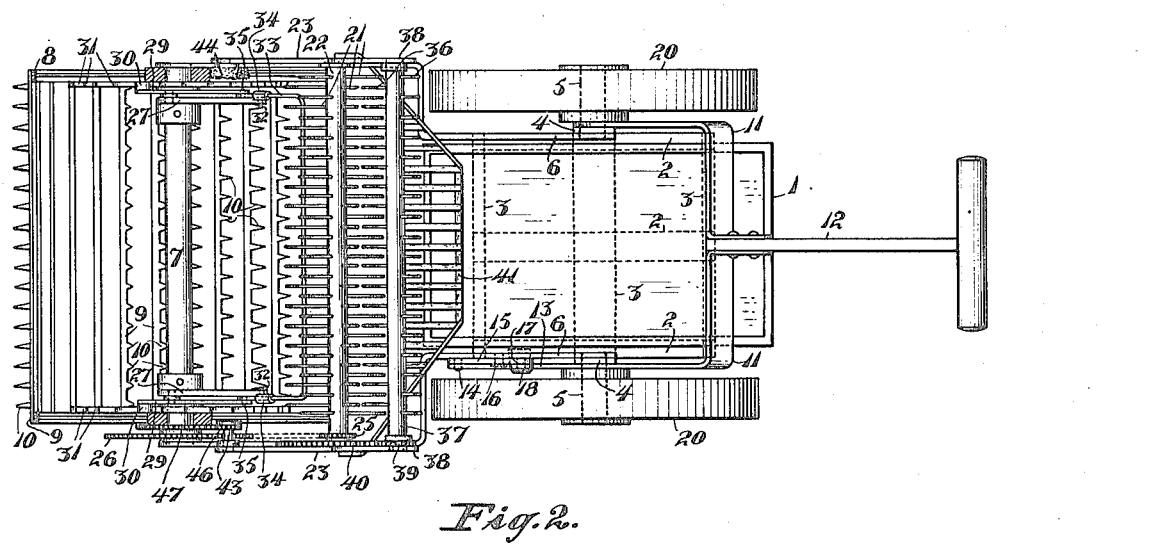
Fig. 2.
WITNESSES:
F. C. Fliedner
G. M. Ball.
INVENTOR,
Peter H. Lint
BY Francis M. Wright,
ATTORNEY

UNITED STATES PATENT OFFICE.

PETER H. LINT, OF LOS GATOS, CALIFORNIA.

FRUIT-GATHERER.

1,136,249.

Specification of Letters Patent.  Patented Apr. 20, 1915.

Application filed June 1, 1914.  Serial No. 842,014.

*To all whom it may concern:*

Be it known that I, PETER H. LINT, a citizen of the United States, residing at Los Gatos, in the county of Santa Clara and State of California, have invented new and useful Improvements in Fruit-Gatherers, of which the following is a specification.

The present invention relates to machines for gathering prunes and other fruit from the ground, the object of the invention being to provide such a machine which will gather the fruit and automatically deliver it into a suitable receptacle without danger of unduly crushing the fruit, and at the same time separating it from leaves and other light material on the ground.

In the accompanying drawing, Figure 1 is a side view of the machine; Fig. 2 is a broken plan view thereof.

Referring to the drawing, 1 indicates a box or receptacle for containing the fruit after it has been gathered. Said box rests upon three longitudinal bars 2, and three transverse bars 3, of which the central transverse bar is bent up at the ends, the upwardly extending portions 4 of said bar being pivoted at their upper ends upon axles 5 of wheels 20, said axles extending outwardly from the rear ends of side frame pieces 6, in the front ends of which is secured a stationary shaft 7, around which can rotate a roller 8, having secured thereon a circumferential series of longitudinal bars 9, formed with prongs 10 by means of which said roller rests upon the ground. Also pivoted upon said axles are forked members 11 of a propelling handle 12, one of said forked members being extended, as shown at 13, and pivotally connected, as shown at 14, to an end of a lever 15 pivoted, as shown at 16, upon the frame piece 6 on the same side of the machine, the other end of said lever being pivoted, as shown at 17, to the upper end of a link 18, the lower end of which is attached, as shown at 19, to the adjacent bar 2. With this construction the effect of depressing the handle 12 to raise the roller from the ground, when passing from tree to tree, is to depress the front portion of the box, and thus maintain the bottom of the box substantially level at all times.

The passage of the roller over the ground causes the prunes or other fruit to be impaled upon, or pressed between, the prongs and raised by said prongs until they arrive in proximity to a transferrer comprising curved pins 21, extending from a shaft 22, having its bearings in uprights 23, secured to the frame pieces 6, said shaft being rotated by means of a crossed sprocket chain 24 engaging a sprocket wheel 25 on the shaft and a sprocket wheel 26 secured to, and rotating with, the roller 8. Said pins 21 are arranged in horizontal transverse rows, and the circumferential distance between the ends of the pins of adjacent rows thereof is greater than the circumferential distance between the outer ends of prongs of adjacent rows thereof. But the diameters of the sprocket wheels 25 and 26 are such that the pins rotate much more rapidly than the prongs on the roller, and that every row of pins can pass into the space between two adjacent rows of prongs without coming in contact with the prongs. Moreover the pins and prongs are so arranged that each pin is midway between two prongs of adjacent prongs.

In order to assist the removal of the fruit from the prongs there are secured upon the shaft 7 upwardly extending brackets 27, on which are pivoted, as shown at 28, levers 29, said levers carrying at one end cam rollers 30 which are actuated by ratchet-shaped cams 31 secured to, and rotating with the drum, said cams having on their periphery rise and dwell corresponding to each row of prongs. The other ends of the levers are pivotally secured, as shown at 35, to the lower ends of the side members of a U-shaped extruder 33, said side members being guided in sleeves 34, pivotally secured, as shown at 32, to the ends of the brackets 27. By reason of the passage of the ratchet-shaped cams 31 beneath said rollers said extruder is withdrawn to permit each bar 9 to pass over or around the same, and then when said bar has so passed, the extruder is thrust out, to cause the prunes or other fruit to be disengaged from the next succeeding row of prongs. The fruit thus thrust out is carried upon the pins 21 around and over the shaft 22 and is positively removed from said pins by means of a remover comprising curved pins 36 on a shaft 37 rotatably mounted in extensions 38 of the uprights 23 and having a pinion 39 meshing with a gear wheel 40 on the shaft 22. The prunes or other fruit are then discharged on to a chute 41 the bottom of which is formed with slats permitting leaves and other debris to fall therethrough, said chute discharging the prunes into the box.

In other extensions 42 of the uprights is pivotally mounted a shaft 43 carrying a brush 44 and rotated by a crossed sprocket chain 45 around a sprocket wheel 46 on the shaft 43 and a sprocket wheel 47 secured to and rotating with the drum. Thus the brush removes from the prongs any leaves that may be adhering thereto.

I claim:—

1. In a fruit gathering machine, the combination of a roller having prongs for gathering the fruit, a transferrer having pins, means for rotating the transferrer with the roller and at a greater speed, so that the pins intervene between the prongs, an extruder to thrust the fruit from the prongs, and means for operating said extruder actuated by the movement of the roller.

2. In a fruit gathering machine, the combination of a roller having prongs for gathering the fruit, a transferrer having pins, means for rotating the transferrer with the roller and at a greater speed, so that the pins intervene between the prongs, a U-shaped extruder for thrusting the fruit from the prongs, stationary guides for the side members of the extruder, a lever connected at one end to one of said side members, a cam roller at the other end of said lever, and a ratchet-shaped cam rotating with the roller and actuating said cam roller.

3. In a fruit gathering machine, the combination of a roller having prongs for gathering the fruit, a transferrer having pins, means for rotating the transferrer with the roller and at a greater speed, so that the pins intervene between the prongs, an extruder to thrust the fruit from the prongs, means for operating said extruder actuated by the movement of the roller, and a remover rotating with the transferrer and having pins intervening between those of the transferrer.

4. In a fruit gathering machine, the combination of a roller having prongs for gathering the fruit, a transferrer having pins, means for rotating the transferrer with the roller and at a greater speed, so that the pins intervene between the prongs, an extruder to thrust the fruit from the prongs, means for operating said extruder actuated by the movement of the roller, and a brush rotating with the roller and arranged to brush the prongs thereof.

5. In a fruit gathering machine, the combination of a roller having prongs for gathering the fruit, a transferrer having pins, means for rotating the transferrer with the roller and at a greater speed so that the pins intervene between the prongs, an extruder to thrust the fruit from the prongs, means for operating said extruder actuated by the movement of the roller, a box for receiving the fruit, a handle for propelling the machine, and means whereby the box may be maintained substantially level, notwithstanding the variations in level of the handle.

6. In a fruit gathering machine, the combination of a roller having prongs for gathering the fruit, an extruder within the roller to thrust the fruit from the prongs, means for operating said extruder actuated by the movement of the roller, and means for receiving the fruit so extruded from the prongs.

7. In a fruit gathering machine, the combination of a roller having prongs for gathering the fruit, an extruder within the roller to thrust the fruit from the prongs, transferring means for transferring the fruit extruded from the prongs, and a receptacle moved with the roller and adapted to receive the fruit from said transferring means.

In testimony whereof I have hereunto set my hand in the presence of two subscribing witnesses.

PETER H. LINT.

Witnesses:
F. M. WRIGHT,
D. B. RICHARDS.